US008923338B2

(12) United States Patent
Luo et al.

(10) Patent No.: US 8,923,338 B2
(45) Date of Patent: Dec. 30, 2014

(54) METHOD AND DEVICE FOR RECEIVING NON-SYNCHRONOUS SIGNAL IN OFDMA SYSTEM

(75) Inventors: Yi Luo, Shenzhen (CN); Wenjian Hua, Shenzhen (CN); Wei Ruan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 538 days.

(21) Appl. No.: 12/875,484

(22) Filed: Sep. 3, 2010

(65) Prior Publication Data

US 2010/0329283 A1    Dec. 30, 2010

Related U.S. Application Data

(63) Continuation of application No. PCT/CN2009/070639, filed on Mar. 5, 2009.

(30) Foreign Application Priority Data

Mar. 5, 2008  (CN) .......................... 2008 1 0082735

(51) Int. Cl.
*H04J 1/00* (2006.01)
*H04L 27/26* (2006.01)

(52) U.S. Cl.
CPC .................................. *H04L 27/265* (2013.01)
USPC ........... 370/480; 370/255; 370/254; 370/392; 370/389

(58) Field of Classification Search
USPC ......... 370/480, 335, 252, 336, 210, 329, 491, 370/338, 254; 375/346, 260, 262
See application file for complete search history.

(56) References Cited

U.S. PATENT DOCUMENTS

| 7,822,069 B2* | 10/2010 | Medvedev et al. ............ 370/491 |
| 2005/0286409 A1 | 12/2005 | Yoon et al. |
| 2007/0171889 A1* | 7/2007 | Kwon et al. .................. 370/350 |
| 2007/0177556 A1 | 8/2007 | Chen |

(Continued)

FOREIGN PATENT DOCUMENTS

CN        101047683 A     10/2007

OTHER PUBLICATIONS

PCT Written Opinion of the International Searching Authority issued on Jun. 11, 2009 in corresponding PCT Application No. PCT/CN2009/070639.

(Continued)

*Primary Examiner* — Jamal Javaid
(74) *Attorney, Agent, or Firm* — Staas & Halsey LLP

(57) ABSTRACT

A method and device for receiving a non-synchronous signal in an Orthogonal Frequency Division Multiple Access (OFDMA) system are provided. The method includes the following steps. Fourier transform is performed on a received first time domain signal to acquire a corresponding frequency domain signal. A sub-carrier occupied by a band of a non-synchronous signal to be received in the frequency domain signal is set to zero, inverse Fourier transform is performed on the frequency domain signal to acquire a second time domain signal, and the second time domain signal is subtracted from the first time domain signal. Or, the sub-carrier other than the sub-carrier occupied by the band of the non-synchronous signal to be received in the frequency domain signal is set to zero, and inverse Fourier transform is performed on the frequency domain signal to acquire a time domain received signal corresponding to the band of the non-synchronous signal.

20 Claims, 14 Drawing Sheets

(56) References Cited

U.S. PATENT DOCUMENTS

| | | |
|---|---|---|
| 2007/0202816 A1 | 8/2007 | Zheng |
| 2007/0248151 A1 | 10/2007 | Kim et al. |
| 2007/0263579 A1* | 11/2007 | Ozluturk .................. 370/338 |
| 2008/0240028 A1* | 10/2008 | Ding et al. .................. 370/329 |
| 2009/0245393 A1* | 10/2009 | Stein et al. ............... 375/240.28 |
| 2011/0292816 A1* | 12/2011 | Lee et al. .................. 370/252 |

OTHER PUBLICATIONS

International Search Report mailed Jun. 11, 2009 in corresponding International Patent Application PCT/CN2009/070639.

* cited by examiner

| CP | Time domain waveform of sub-carrier 1 (the first OFDM symbol) | CP | Time domain waveform of sub-carrier 1 (the second OFDM symbol) | ... | CP | Time domain waveform of sub-carrier 1 (the $m^{th}$ OFDM symbol) |
|---|---|---|---|---|---|---|
| CP | Time domain waveform of sub-carrier 2 (the first OFDM symbol) | CP | Time domain waveform of sub-carrier 2 (the second OFDM symbol) | ... | CP | Time domain waveform of sub-carrier 2 (the $m^{th}$ OFDM symbol) |
| CP | Time domain waveform of sub-carrier 3 (the first OFDM symbol) | CP | Time domain waveform of sub-carrier 3 (the second OFDM symbol) | ... | CP | Time domain waveform of sub-carrier 3 (the $m^{th}$ OFDM symbol) |
| ⋮ | | ⋮ | | | | ⋮ |
| CP | Time domain waveform of sub-carrier n (the first OFDM symbol) | CP | Time domain waveform of sub-carrier n (the second OFDM symbol) | ... | CP | Time domain waveform of sub-carrier n (the $m^{th}$ OFDM symbol) |

FIG. 2a

METHOD AND DEVICE FOR RECEIVING NON-SYNCHRONOUS SIGNAL IN OFDMA SYSTEM

CROSS-REFERENCE TO RELATED APPLICATIONS

This application is a continuation of International Application No. PCT/CN2009/070639, filed on Mar. 5, 2009, which claims priority to Chinese Patent Application No. 200810082735.8, filed on Mar. 5, 2008, both of which are hereby incorporated by reference in their entireties.

FIELD OF THE TECHNOLOGY

The present invention relates to the field of wireless communication, and more particularly to a method and device for receiving a non-synchronous signal in an OFDMA system.

BACKGROUND OF THE INVENTION

Generally, an Orthogonal Frequency Division Multiple Access (OFDMA) system utilizes an Orthogonal Frequency Division Multiplexing (OFDM) technology to realize uplink multiple access.

In an uplink time-frequency domain signal under an Ultra Mobile Broadband (UMB) standard protocol of the 3rd Generation Partnership Project2 (3GPP2), multi-user signals are multiplexed in a manner of a hybrid of OFDMA and Code Division Multiple Access (CDMA) (that is, multiplexed in a manner of OFDMA+CDMA). A device of the signals is superframe, each superframe has 25 physical frames, each physical frame includes 8 OFDM symbols F0 to F7, and F7 is an all 0 signal. In a case that a terminal during initial access is converted from an idle state to an active state or out-of-synchronization, due to mobile characteristics of a user terminal, the user terminal cannot know synchronization information of the system, so that the user terminal needs to acquire initial synchronization information from an Access Network (AN) by sending a random access signal, and initially synchronize with the system according to the initial synchronization information. At the time of initially synchronizing with the system, the terminal further carries partial resource request information, and the AN allocates resources according to the information. The random access signal generally consists of a prefix and a message. Main functions of the prefix are realizing synchronization of uplink signals, and carrying random access information of the user terminal and so on; and the message generally carries connection request information and the like. A random access prefix is also referred to as a random access probe. A UMB protocol specially designs a Reverse Link Access Channel (RACH) for sending the random access probe. When sending an RACH signal, the terminal selects different Walsh sequences according to upper layer information. The length of a Walsh sequence is 1024. Discrete Fourier Transform (DFT) is performed on the Walsh sequence, after being scrambled and interleaved, with a device of 128 sequence elements to acquire 8 corresponding sequences with the length of 128. These sequences are mapped to 128 sub-carriers occupied by RACH channels on F0 to F7, and then sent to a base station through a radio frequency device after being OFDM modulated.

For detection of non-synchronous signals such as RACH signals, signal receiving methods generally adopted are: a frequency domain receiving method and a time domain receiving method.

In an OFDMA system based on the UMB protocol, for a cell with an access range smaller than or equal to 976 m, a universal method for receiving and processing a signal is the frequency domain receiving method. A basic idea of the method is as follows. A receiving end removes the window and the Cyclic Prefix (CP) in a received signal according to synchronization information of a sector in the OFDMA system. DFT is performed on the received signal with the window and the CP removed to transform the signal to a frequency domain at a device of an OFDM symbol time, so as to obtain the received signal on each sub-carrier, extract the received signal of a sub-carrier occupied by an RACH channel, and perform zero interpolation of a certain over-sampling multiplier on the signal to achieve an over-sampling purpose. Inverse Discrete Fourier Transform (IDFT) is then performed to obtain a time domain received signal of the RACH channel, and a cyclic shift is made at a device of an OFDM symbol, where an initial position of the cyclic shift is a delay time of the signal, and the number of times of the cyclic shift is in direct proportion to a maximum time delay (that is, the maximum time delay=the number of the cyclic shift×sampling interval). Afterwards, data after cyclic shift are spliced, the sequence number of a sent sequence is obtained through a conventional detecting and decision method, and thus delay characteristics of a received sequence and information carried by the sequence are obtained.

A basic idea of the time domain receiving method of the prior art is as follows. A time domain filter is adopted to filter a received time domain signal to eliminate interference of the band other than the band of the RACH channel, and then a conventional time domain detecting method is employed to detect the RACH channel to acquire RACH signal time-delay information and access information.

In the implementation of the present invention, the inventors found that the existing non-synchronous signal frequency domain receiving method has at least the following disadvantages, such as great difficulty in detecting the RACH signal with a transmission delay larger than the CP, and high complexity of a receiving end. Moreover, since the existing time domain receiving method needs to design and use a filter, at least the following disadvantage exist: high complexity of the receiving end.

SUMMARY OF THE INVENTION

Accordingly, the present invention is directed to a method and device for receiving a non-synchronous signal in an OFDMA system, so as to detect a signal indicating that an arrival time of an OFDM multi-carrier signal exceeds one CP duration of the system time, and reduce the complexity of the receiving end.

In order to solve the above technical problem, in a first embodiment, the present invention provides a method for receiving a non-synchronous signal in an OFDMA system, which includes the following steps.

Fourier transform is performed on a received first time domain signal to acquire a corresponding frequency domain signal.

A sub-carrier occupied by a band of a non-synchronous signal to be received in the frequency domain signal is set to zero, inverse Fourier transform is performed on the frequency domain signal to acquire a second time domain signal, and the second time domain signal is subtracted from the first time domain signal to acquire a time domain received signal corresponding to the band of the non-synchronous signal. Or, the sub-carrier other than the sub-carrier occupied by the band of the non-synchronous signal to be received in the frequency domain signal is set to zero, and inverse Fourier transform is performed on the frequency domain signal to acquire a time domain received signal corresponding to the band of the non-synchronous signal.

In the method for receiving a non-synchronous signal in an OFDMA system according to the first embodiment of the present invention, firstly, Fourier transform is performed on the first time domain signal received via an antenna to transform the signal to the corresponding frequency domain signal. By using information of the band of the non-synchronous signal to be received in the frequency domain signal, the sub-carrier occupied by the non-synchronous signal to be received is set to zero, inverse Fourier transform is performed on the frequency domain signal to transform the signal to a time domain so as to acquire the second time domain signal, and then the second time domain signal obtained by inverse Fourier transform is subtracted from the received first time domain signal. Or, by using the information of the band of the non-synchronous signal to be received in the frequency domain signal, sub-carriers occupied by other bands than the band of the non-synchronous signal to be received are set to zero, and inverse Fourier transform is performed on the frequency domain signal to transform the signal to a time domain, so as to eliminate interference of the other bands to the band of the non-synchronous signal, and extract the time domain received signal of the band corresponding to the non-synchronous signal, so that the receiving end is enabled to perform detection with a conventional time domain receiving method. Since it is unnecessary to design and use a time domain filter, and a process of extracting the time domain received signal corresponding to the band of the non-synchronous signal is simple, the complexity of detecting the non-synchronous signal in the OFDMA system is reduced significantly, and a signal indicating that an arrival time of an OFDM multi-carrier signal exceeds one CP duration of the system time may also be detected.

In order to solve the above technical problem, in a second embodiment, the present invention provides a device for receiving a non-synchronous signal in an OFDMA system, which includes a frequency domain transform device and an interference eliminating device.

The frequency domain transform device is configured to perform Fourier transform on a first time domain signal received to acquire a corresponding frequency domain signal.

The interference eliminating device is configured to set a sub-carrier occupied by a band of a non-synchronous signal to be received in the frequency domain signal to zero, perform inverse Fourier transform on the frequency domain signal to acquire a second time domain signal, and subtract the second time domain signal from the first time domain signal to acquire a time domain received signal corresponding to the band of the non-synchronous signal; alternatively, configured to set the sub-carrier other than the sub-carrier occupied by the band of the non-synchronous signal to be received in the frequency domain signal to zero, and perform inverse Fourier transform on the frequency domain signal to acquire a time domain received signal corresponding to the band of the non-synchronous signal.

In the device for receiving a non-synchronous signal in an OFDMA system according to the second embodiment of the present invention, the frequency domain transform device performs Fourier transform on the received first time domain signal to transform the signal to the corresponding frequency domain signal. By using information of the band of the non-synchronous signal to be received in the frequency domain signal, the interference eliminating device sets the sub-carrier occupied by the non-synchronous signal to be received to zero, performs inverse Fourier transform on the frequency domain signal to transform the signal to a time domain so as to acquire the second time domain signal, and subtracts the second time domain signal output by the time domain transform device from the received first time domain signal. Alternatively, by using the information of the band of the non-synchronous signal to be received in the frequency domain signal, the interference eliminating device sets sub-carriers occupied by other bands than the band of the non-synchronous signal to be received to zero, and performs inverse Fourier transform on the frequency domain signal to transform the signal to a time domain, so as to eliminate interference of the other bands to the band of the non-synchronous signal, and acquire the time domain received signal corresponding to the band of the non-synchronous signal, so that interference of the other bands to the band of the non-synchronous signal is eliminated. Since it is unnecessary to design and use a time domain filter, and a process of extracting the time domain received signal corresponding to the band of the non-synchronous signal is simple, the complexity of detecting the non-synchronous signal in the OFDMA system is reduced significantly. Meanwhile, since the non-synchronous signal is processed with a time domain receiving method, a signal indicating that an arrival time of an OFDM multi-carrier signal exceeds one CP duration of the system time can be detected.

BRIEF DESCRIPTION OF THE DRAWINGS

FIG. 2a is a schematic view of a received time domain signal with a time delay shorter than one CP in an OFDMA system according to the present invention;

DETAILED DESCRIPTION OF THE EMBODIMENTS

The technical solutions of the present invention are described in detail below with reference to embodiments and the accompanying drawings.

Figure 1:
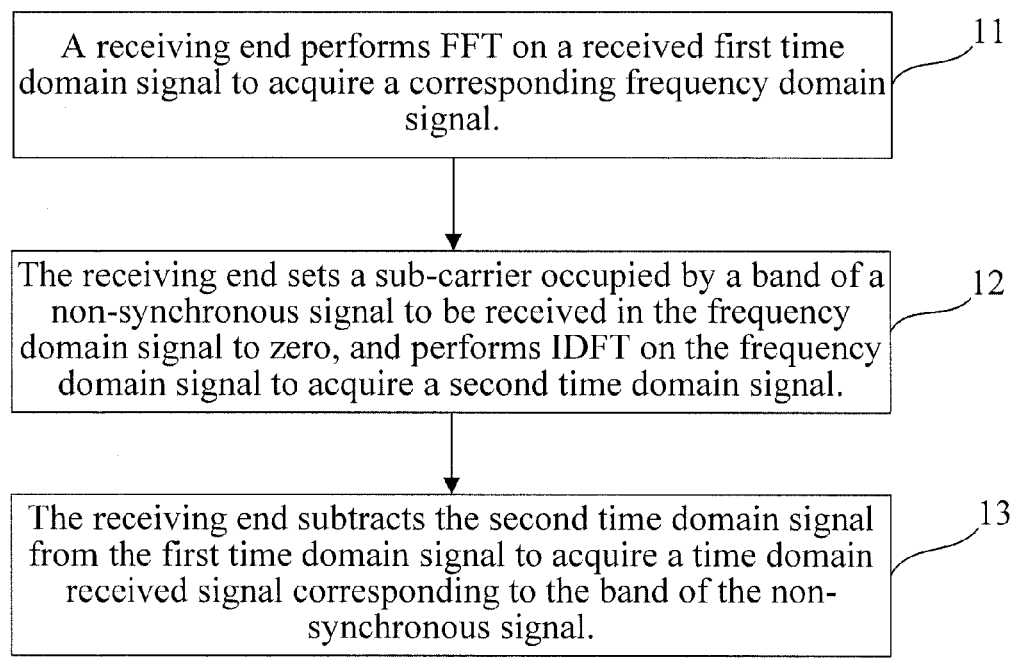
FIG. 1 is a flow chart of a first embodiment of a method for receiving a non-synchronous signal in an OFDMA system according to the present invention.

FIG. 1 is a flow chart of a first embodiment of a method for receiving a non-synchronous signal in an OFDMA system according to the present invention. As shown in FIG. 1, the method of this embodiment includes the following steps.

In step 11, a receiving end performs Fast Fourier Transform (FFT) on a time domain signal (that is, a first time domain signal) received via an antenna and an intermediate radio frequency device, to acquire a corresponding frequency domain signal.

For example, in an OFDMA system, when a time delay between a signal received by the receiving end and a signal sent by a sending end is within one CP of the system, the received signal is as shown in FIG. 2a. In FIG. 2a, sub-carriers allocated to different users by the system are different. For example, a user 1 occupies sub-carriers 1 and 2; and a user 2 occupies a sub-carrier 3, so that the sub-carriers occupied by different users are different. A time interval between a CP and window and another CP and window is a time for sending one OFDM symbol.

Figure 2B:
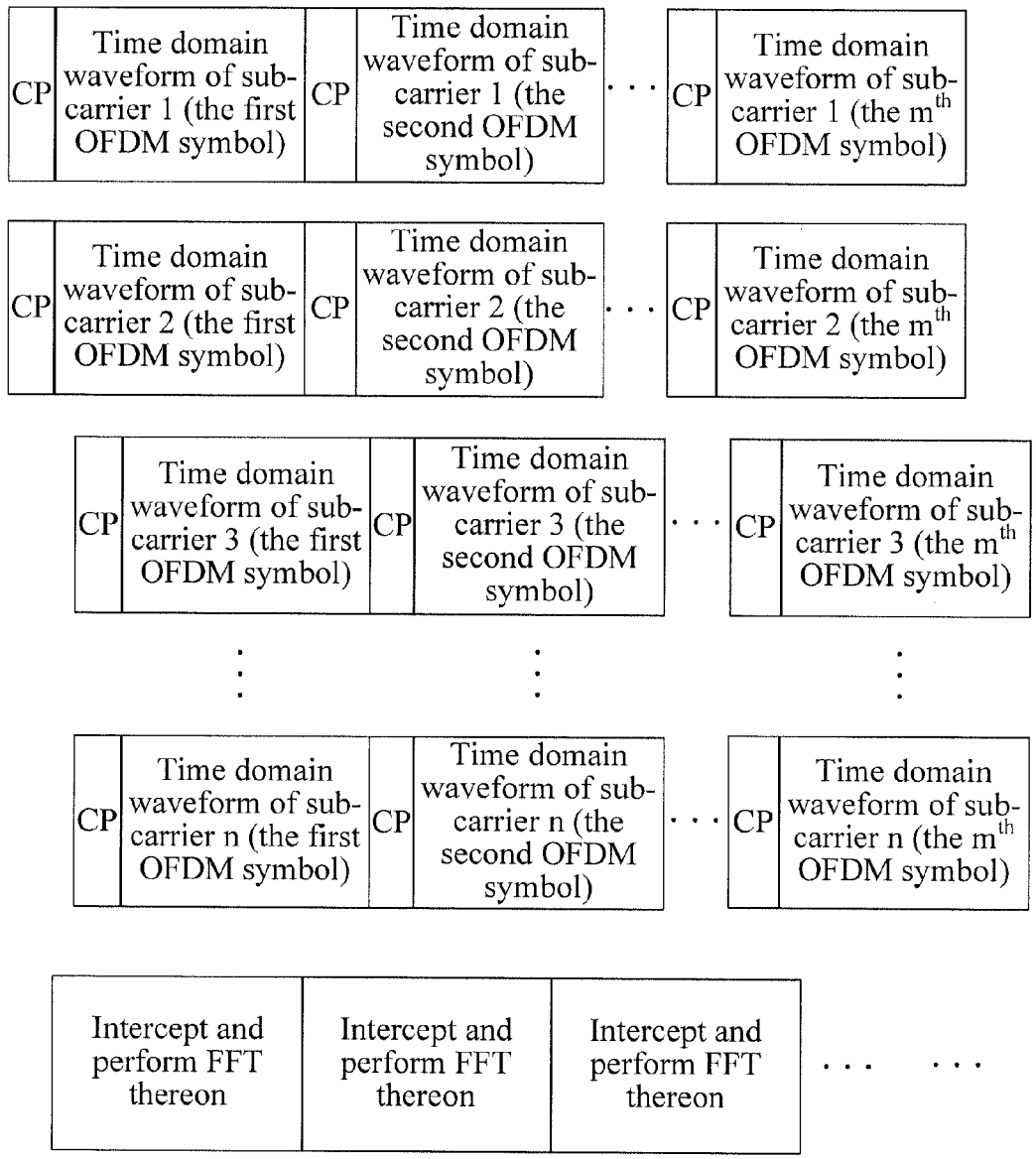
FIG. 2b is a schematic view of a non-synchronous time domain signal with a time delay exceeding one CP and its interception method in the first embodiment of the method for receiving a non-synchronous signal in an OFDMA system according to the present invention.
Figure 2C:
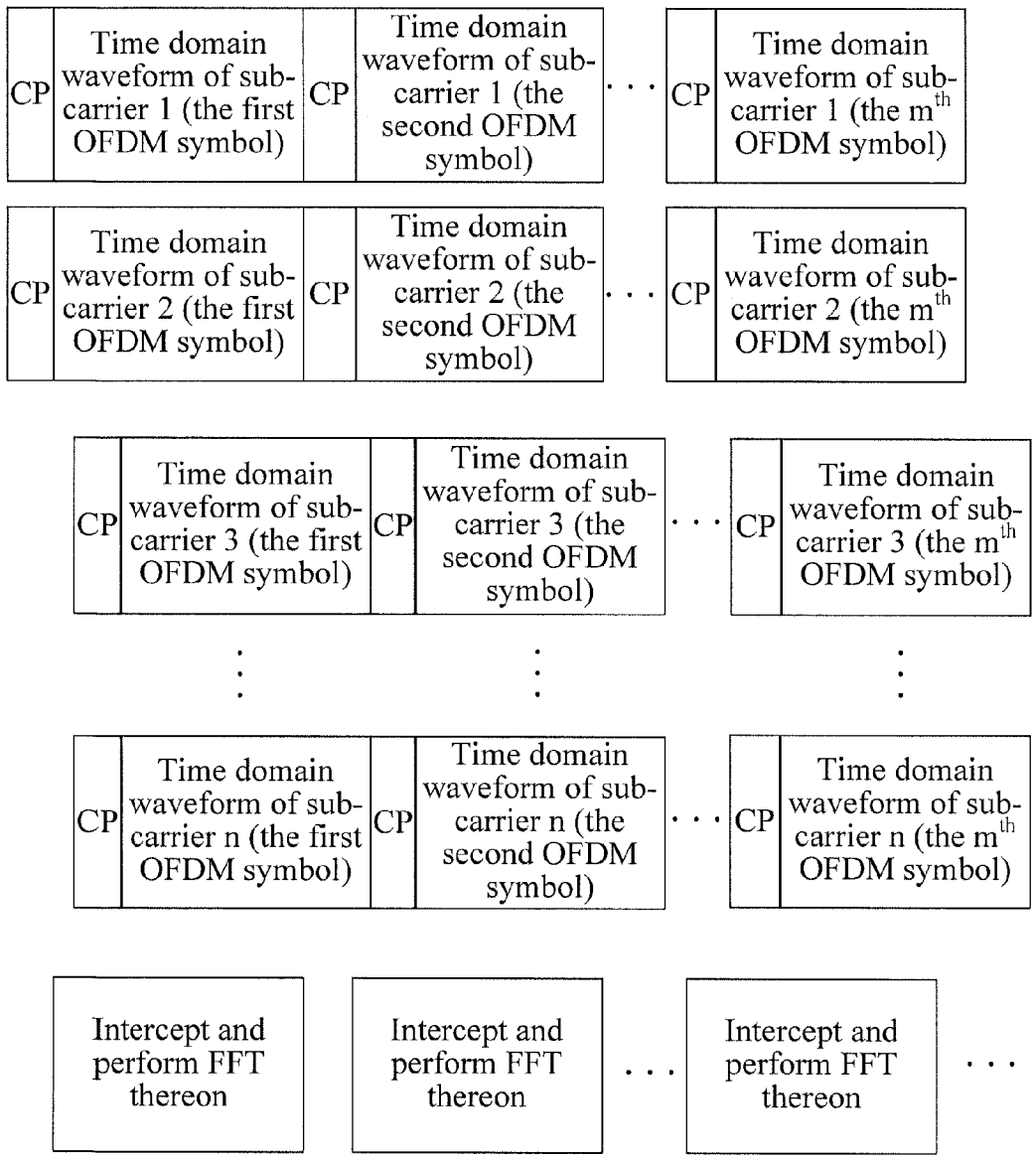
FIG. 2c is a schematic view of a non-synchronous time domain signal with a time delay exceeding one CP and its interception method in a second embodiment of a method for receiving a non-synchronous signal in an OFDMA system according to the present invention.

However, when the time delay between the signal received by the receiving end and the signal sent by the sending end exceeds one CP of the system, the signal received by the receiving end is as shown in FIGS. 2b and 2c. At this time, methods provided in FIGS. 2b and 2c can be adopted to intercept a time domain received signal and perform FFT thereon. In this embodiment, the method provided in FIG. 2b is adopted to intercept a time domain signal and perform FFT thereon, where it is assumed that the time of receiving the time domain signal by the receiving end is the time that the time domain signal arrives to the receiving end, the CP in the received time domain signal is reserved, the received time domain signal is consecutively intercepted at a device of a time interval lasting for receiving one or more OFDM symbols, and FFT is performed on the intercepted signal to obtain a corresponding frequency domain signal.

In step 12, the receiving end sets a sub-carrier occupied by a band of a non-synchronous signal to be received in the frequency domain signal to zero, and performs IDFT on the frequency domain signal after setting the sub-carrier occupied by the band of the non-synchronous signal to zero, to acquire another time domain signal (that is, a second time domain signal) after IDFT.

In step 13, the receiving end subtracts the second time domain signal obtained by IDFT from the received first time domain signal, to eliminate interference of the other bands to the band of the non-synchronous signal, and acquire a time domain received signal corresponding to the band of the non-synchronous signal.

In this embodiment, firstly, FFT is performed on the first time domain signal received via the antenna to transform the signal to the corresponding frequency domain signal. By using information of the band of the non-synchronous signal to be received in the frequency domain signal, the sub-carrier occupied by the non-synchronous signal to be received is set to zero, IDFT is performed on the frequency domain signal to transform the signal to a time domain so as to acquire the second time domain signal, and then the second time domain signal is subtracted from the first time domain signal, to eliminate interference of the other bands to the band of the non-synchronous signal, and extract the time domain received signal corresponding to the band of the non-synchronous signal, so that the receiving end is enabled to detect with a conventional time domain receiving method. Since it is unnecessary to design and use a time domain filter, and a process of extracting the time domain received signal corresponding to the band of the non-synchronous signal is simple, the complexity of detecting the non-synchronous signal in the OFDMA system is reduced significantly, and a signal indicating that an arrival time of an OFDM multi-carrier signal exceeds one CP duration of the system time may also be detected.

A second embodiment of a method for receiving a non-synchronous signal in an OFDMA system according to the present invention may be a specific application at the time of detecting an RACH signal in an OFDMA system supporting a UMB protocol with the method for receiving a non-synchronous signal in an OFDMA system according to the present invention.

Figure 3:
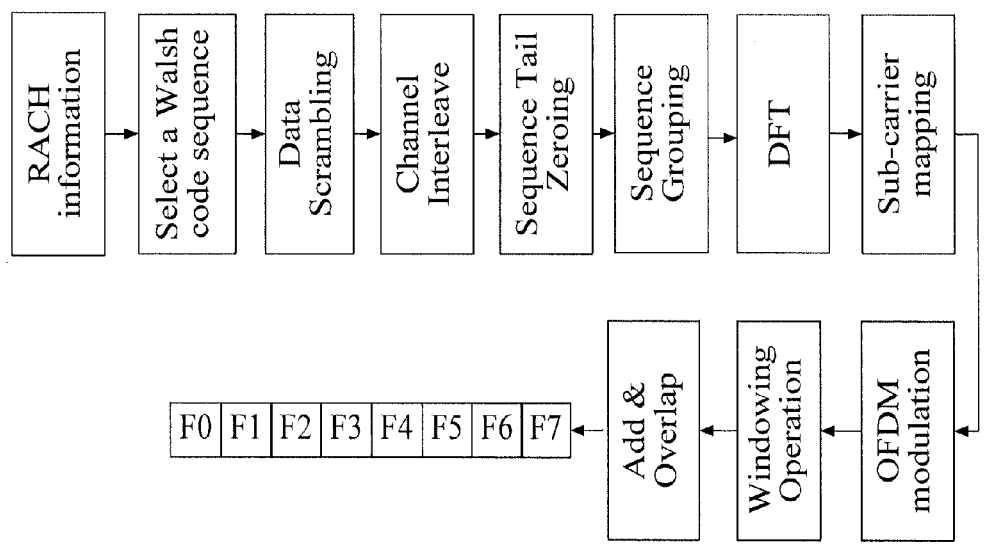
FIG. 3 is a flow chart of a method for transmitting an RACH signal in an OFDMA system of the prior art.

In order to better illustrate the technical solution of this embodiment, a method for transmitting an RACH signal of the prior art is introduced first. FIG. 3 is a flow chart of a method for transmitting an RACH signal in an OFDMA system of the prior art. As shown in FIG. 3, a procedure of the method for transmitting an RACH signal includes: a sending end selects a Walsh code sequence according to information that needs to be sent by an RACH channel (RACH Information), and transmits an RACH signal after performing Data Scrambling, Channel Interleave, Walsh code sequence Tail Zeroing, sequence Grouping, 128 points DFT, CP adding, OFDM Modulation, Windowing Operation and Add & Overlap on the Walsh code sequence.

Generally, for a cell with an access range larger than 1 km in the OFDMA system, it is very difficult to detect the RACH signal with the existing frequency domain receiving method. In some situations, it is required to support a cell with a larger access range, for example, a cell with a radius of 15 km. In a case that a user terminal and the system are not synchronous, a possible maximum delay (Timing Offset) of the system is approximately 100 μs. While for an OFDMA system with a bandwidth of 10 MHz, 100 μs corresponds to a delay of 983 samplings; and for an OFDMA system with a bandwidth of 20 MHz, 100 μs corresponds to a delay of 1996 samplings. Four types of lengths of a CP specified by an existing prototype are present, where the shortest length is 6.51 μs, and the maximum length is 26.04 μs. Thus, a delay corresponding to the access coverage is far greater than one CP duration, so that a frequency domain signal extracted with the frequency domain receiving method does not contain a complete RACH signal any more, and difficulties occur in detecting the RACH signal by using the universal frequency domain receiving method in the OFDMA system of the prior art. Although theoretically the frequency domain signal can be extracted many times, and the extracted frequency domain signals are detected with the frequency domain receiving method respectively, the complexity of the receiving end is increased dramatically, and it is difficult to realize with existing hardware condition and the cost is high. However, by using the existing time domain receiving method, the received time domain signal is filtered through a time domain filter, and an RACH signal with a transmission delay larger than a CP can be detected, but the complexity of the receiving end is high. The reason is that a band removed by filtering with the existing filter generally has a fixed bandwidth, while a CDMA band signal is transmitted in a manner of frequency hopping, and two adjacent CDMA band signals may have an overlapping part on a frequency domain, so that it is inconvenient to use the existing time domain filter to acquire CDMA band data. Besides, it is difficult to design the time domain filter, and meanwhile information interaction needs to be performed between the baseband and intermediate frequency part, so the complexity of signal detection is high. Furthermore, the complexity of the existing time domain filter is high, which increases the system costs and difficulty of implementation.

Therefore, by using the method of this embodiment, the RACH signal can be detected and the complexity of the receiving end is reduced.

Figure 4A:
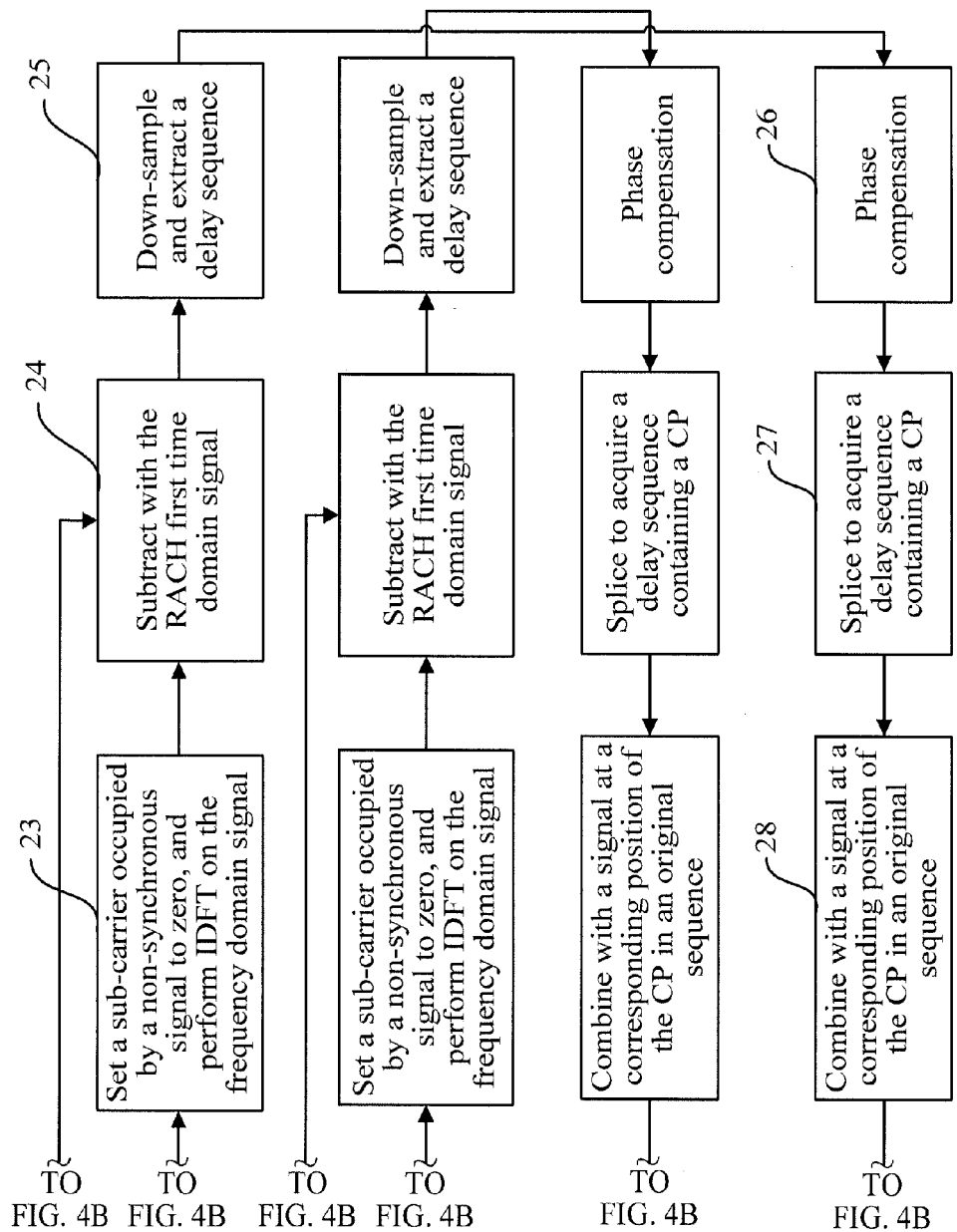
FIGS. 4A and 4B are flow charts of the second embodiment of the method for receiving a non-synchronous signal in an OFDMA system according to the present invention.
Figure 4B:
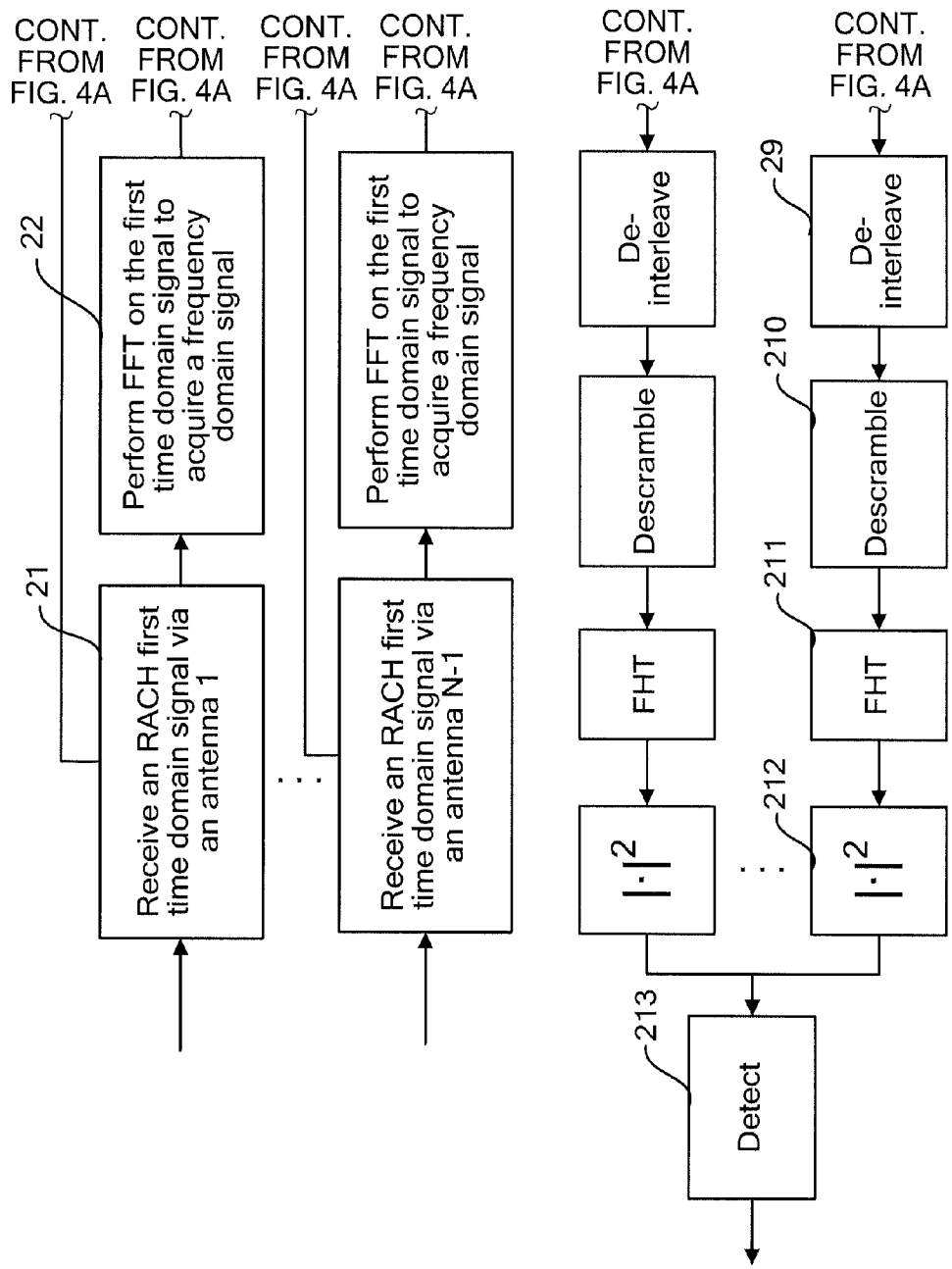

FIGS. 4A and 4B are flow charts of the second embodiment of the method for receiving a non-synchronous signal in an OFDMA system according to the present invention. The method of this embodiment may be a specific application at the time of detecting the RACH signal as sent in FIG. 3 in an OFDMA system based on a UMB protocol. As shown in FIGS. 4A and 4B, the method of this embodiment includes the following steps.

In step 21, a receiving end receives an RACH time domain signal (that is, an RACH first time domain signal) sent by each antenna (assuming N antennas are present totally) respectively through an RACH channel.

In step 22, the receiving end performs FFT on the received RACH first time domain signal, and acquires a corresponding frequency domain signal according to frequency characteristics of the frequency domain signal.

In step 23, the receiving end sets a sub-carrier occupied by a band of the RACH signal to be received in the frequency domain signal to zero, and performs IDFT on the frequency domain signal after setting the sub-carrier occupied by the band of the RACH signal to zero, to acquire another RACH time domain signal (that is, an RACH second time domain signal).

In step 24, the receiving end subtracts the RACH second time domain signal obtained by IDFT from the received RACH first time domain signal, to acquire a time domain received signal corresponding to the band of the RACH signal. The time domain received signal may be a CDMA band signal.

In step 25, the receiving end down-samples the CDMA band signal, and extracts a delay received sequence of the CDMA band signal corresponding to each time-delay point respectively.

In step 26, phase compensation is performed on each delay received sequence.

In step 27, each delay received sequence after phase compensation is spliced respectively to acquire a complete delay received sequence including a CP.

In step 28, a signal of the CP and a signal of a corresponding position in the original sequence are combined in each spliced delay received sequence.

When each delay received sequence after phase compensation is spliced in step 27, the CP and the window in the CDMA band signal are reserved, and the energy in the CP and the window is applied to detect the RACH signal, which improves the detecting performance of the system. However, since the CP is reserved in the delay received sequence, the number of points of the delay received sequence (for example, 1108 sub-carriers are occupied, that is, 1108 points) is larger than the number of points of the original sequence (for example, 1024 sub-carriers are occupied, that is, 1024 points), and the number of points of the delay received sequence is not equal to $2^n$, each descrambled delay received sequence cannot be processed with Fast Hadamard Transform (FHT). Although the RACH signal may also be detected and decided with other operation methods, the operation complexity of the receiving end is increased. Therefore, in order to process each descrambled delay received sequence with FHT, the signal of the CP and the signal of the corresponding position in the original sequence in the spliced delay received sequence are combined in step 28 of this embodiment, so that the length of the combined delay received sequence is the same as the length of the original sequence (for example, both the delay received sequence and the original sequence occupy 1024 sub-carriers, that is, both have 1024 points). Hence, each descrambled delay received sequence can be processed with FHT, and the operation complexity of the receiving end is reduced significantly while the system detecting energy is increased.

For example, the sent signal in this embodiment does not include any window, but the operations of the window are similar to that of the CP. It is assumed that the RACH signal sent by a user terminal adopts a Walsh code sequence with the length of 8, and the length of the CP is 2. For example, a Walsh sequence selected by the sending end is:
1 −1 1 −1 1 −1 1 −1.

If a selecting rule for the CP of the sending end is: the last two bits (1 −1) of the Walsh code are selected as a CP, a sequence added with the CP is:
(1 −1) 1 −1 1 −1 1 −1 1 −1.

It is assumed that an initial time of the delay sequence obtained by the receiving end after splicing is the same as the time that the RACH signal arrives to the receiving end, and a spliced sequence is:
R1 R2 R3 R4 R5 R6 R7 R8 R9 R10.

According to the selecting rule for the CP of the sending end, a sent signal of R1 is the same as that of R9, and a sent signal of R2 is the same as that of R10. At this time, in order to reduce the complexity of the receiving end with the spliced delay received sequence through FHT, the signal of the received sequence and the signal at the corresponding position in the original sequence are combined, that is, R1 and R9 are combined, and R2 and R10 are combined. Various methods for combining the signals are present. For example, a mean value of R1 and R9, and a mean value of R2 and R10 can be calculated respectively as signals of R9 and R10 of the combined sequence, and signals of R1 and R2 of the combined sequence are deleted. Persons skilled in the art may also adopt other methods for combining the signals. The length of the combined sequence is the same as that of the Walsh code sequence selected by the sending end, both of which are equal to $2^n$, and FHT can be used in subsequent processing of the signal, so that the complexity of the receiving end is reduced significantly.

In step 29, the delay received sequence obtained at each time-delay point is de-interleaved.

In step 210, the delay received sequence obtained at each time-delay point is descrambled.

In step 211, FHT is performed on each descrambled delay received sequence.

In step 212, a modular square of a value corresponding to each transformed delay received sequence is calculated respectively, and a sum of modular squares of values corresponding to each time-delay point of different antennas is calculated.

In step 213, a maximum value of the sum of the modular squares of FHT results at each time-delay point of different antennas calculated in step 212 is used as a maximum correlation peak at each time-delay point of the RACH signal, and the RACH signal is detected and decided according to the maximum correlation peak at each time-delay point, so as to acquire time-delay information of the RACH channel and related information carried by the RACH channel.

When the RACH signal is detected and decided according to the maximum correlation peak, in order to ensure certain false alarm probability, a false alarm threshold may be preset. When the maximum correlation peak is selected, it is required to compare a magnitude of a modular square of a corresponding value in the delay received sequence after FHT at each time-delay point with the false alarm threshold. If the maximum modular square is smaller than the false alarm threshold, the receiving end decides that the RACH signal is not received, and information on a corresponding RACH sequence is not output. On the contrary, if the maximum modular square is larger than or equal to the false alarm threshold, the receiving end acquires RACH information according to the maximum correlation peak, and reports the RACH information to an upper layer processing server of the system, and the upper layer processing server performs corresponding service control according to the information.

Step 213 in this embodiment is implemented as follows. Modular squares of values after FHT received by each time-delay point of different antennas are added to obtain a sum of the modular squares at each time-delay point, and a Walsh code sequence number and a time-delay point corresponding to a maximum value of the sums of the modular squares (that is, the maximum correlation peak) are selected. If the maximum value is smaller than the false alarm threshold, it is considered that the user does not send an RACH signal; otherwise, the time-delay point is regarded as the strongest path. Meanwhile, a time-delay point having a modular square value corresponding to the Walsh sequence number greater than the false alarm threshold is regarded as one path in a propagation channel from the sending end to a base station, and synchronization information of the RACH channel, such as the time delay, the strongest path, and the path distribution, is obtained with these paths through some algorithms. According to the Walsh code sequence number, the RACH information is acquired. The RACH information may include: identity information (ID information) of a user terminal initiating a random access request, time-delay information, information of the Walsh code sequence number, and so on. After acquiring the RACH information, the receiving end reports the information to the upper layer processing server of the system, and the upper layer processing server performs corresponding service control according to the information.

In this embodiment, when the CDMA band signals after phase compensation are spliced, the CP and the window are reserved, and the delay received sequence including the CP and the window is obtained. In this manner, it is advantageous of fully utilizing the sending energy of the CP and the window in the delay received sequence, and increasing the detecting energy of a random access channel, so as to improve the detecting performance of the system.

Figure 5:
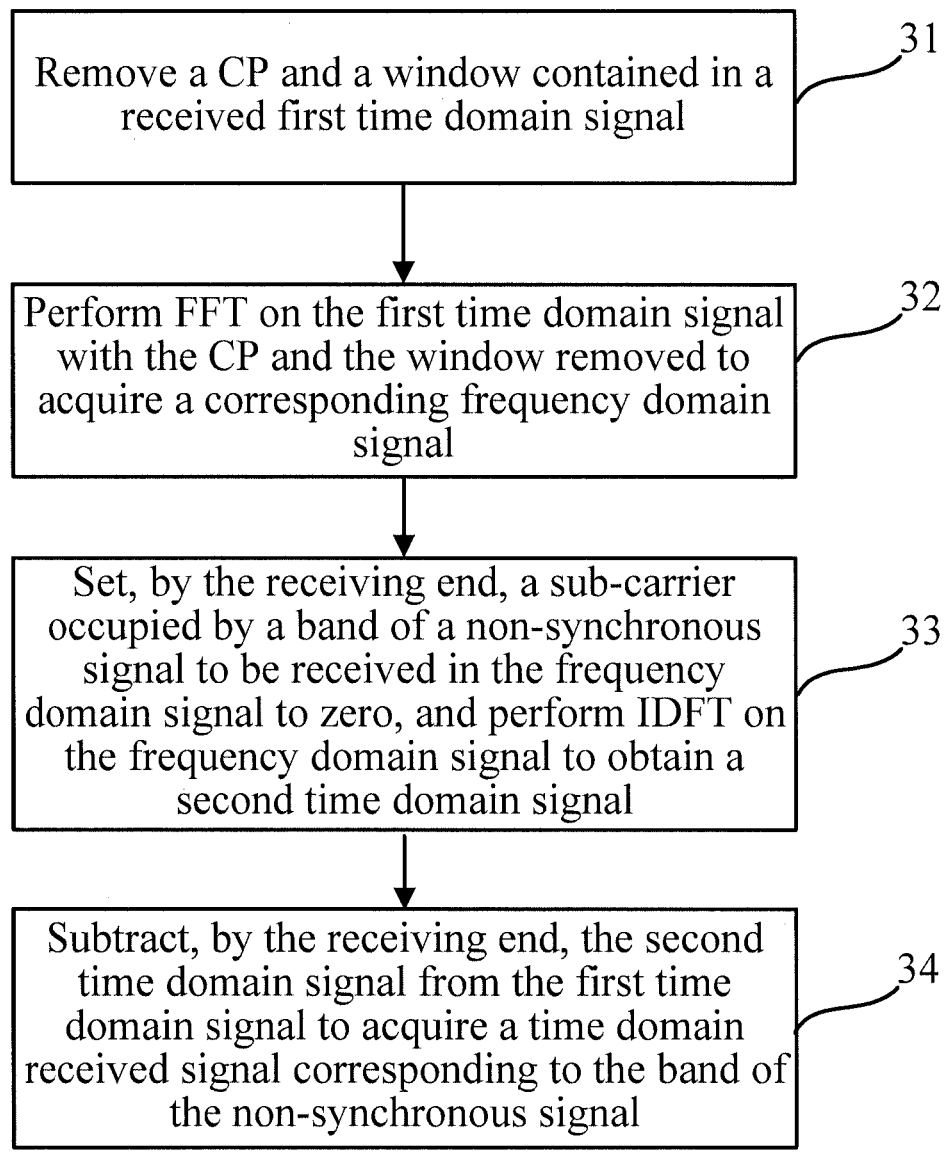
FIG. 5 is a flow chart of a third embodiment of a method for receiving a non-synchronous signal in an OFDMA system according to the present invention.

FIG. 5 is a flow chart of a third embodiment of a method for receiving a non-synchronous signal in an OFDMA system according to the present invention. As shown in FIG. 5, the method of this embodiment includes the following steps.

In step 31, according to a synchronous signal of a sector in an OFDMA system, a receiving end removes the CP and the window contained in a received time domain signal (that is, a first time domain signal) with a synchronous signal time alignment method.

In step 32, FFT is performed on the first time domain signal with the CP and the window removed to acquire a corresponding frequency domain signal.

For example, in the OFDMA system, when a time delay between a signal received by the receiving end and a signal sent by a sending end exceeds one CP of the system, the method as shown in FIG. 2c can be adopted to intercept a time domain received signal and perform FFT thereon, where it is assumed that the time of receiving the first time domain signal by the receiving end is the time that the first time domain signal arrives to the receiving end, the CP in the first time domain signal is removed, the first time domain signal is consecutively intercepted at a device of time lasting for receiving one OFDM symbol and with an interval of a time duration of one CP, and FFT is performed on the intercepted signal to obtain a corresponding frequency domain signal.

In step 33, the receiving end sets a sub-carrier occupied by a band of a non-synchronous signal to be received in the frequency domain signal to zero, and performs IDFT on the frequency domain signal after setting the sub-carrier occupied by the band of the non-synchronous signal to zero, to obtain another time domain signal (that is, a second time domain signal).

In step 34, the receiving end subtracts the second time domain signal after IDFT from the received first time domain signal, to acquire a time domain received signal corresponding to the band of the non-synchronous signal.

This embodiment does not need to design or use a time domain filter with a fixed bandwidth. Instead, a synchronous signal frequency domain receiving method in the prior art is adopted to intercept the received first time domain signal. After FFT is performed on the received first time domain signal to transform the signal to a frequency domain, a sub-carrier occupied by the non-synchronous signal to be received is set to zero, and IDFT is then performed on the frequency domain signal to transform the signal to a time domain so as to acquire the second time domain signal. Interference between the second time domain signal and the originally received first time domain signal is eliminated, to acquire a time domain received signal corresponding to the band of the non-synchronous signal. This embodiment is easy to implement and can obtain a complete OFDM band symbol. Besides, only the interference of the time domain received signal corresponding to the OFDM band signal (instead of the complete time domain received signal) is eliminated, so that the complexity of the operation that the receiving end detects the non-synchronous signal in the OFDMA system is further reduced. Moreover, as a time domain receiving method is employed to process the non-synchronous signal in this embodiment, a signal indicating that an arrival time of an OFDM multi-carrier signal exceeds one CP duration of the system time can be detected, and the complexity of the receiving end is also reduced.

Figure 6A:
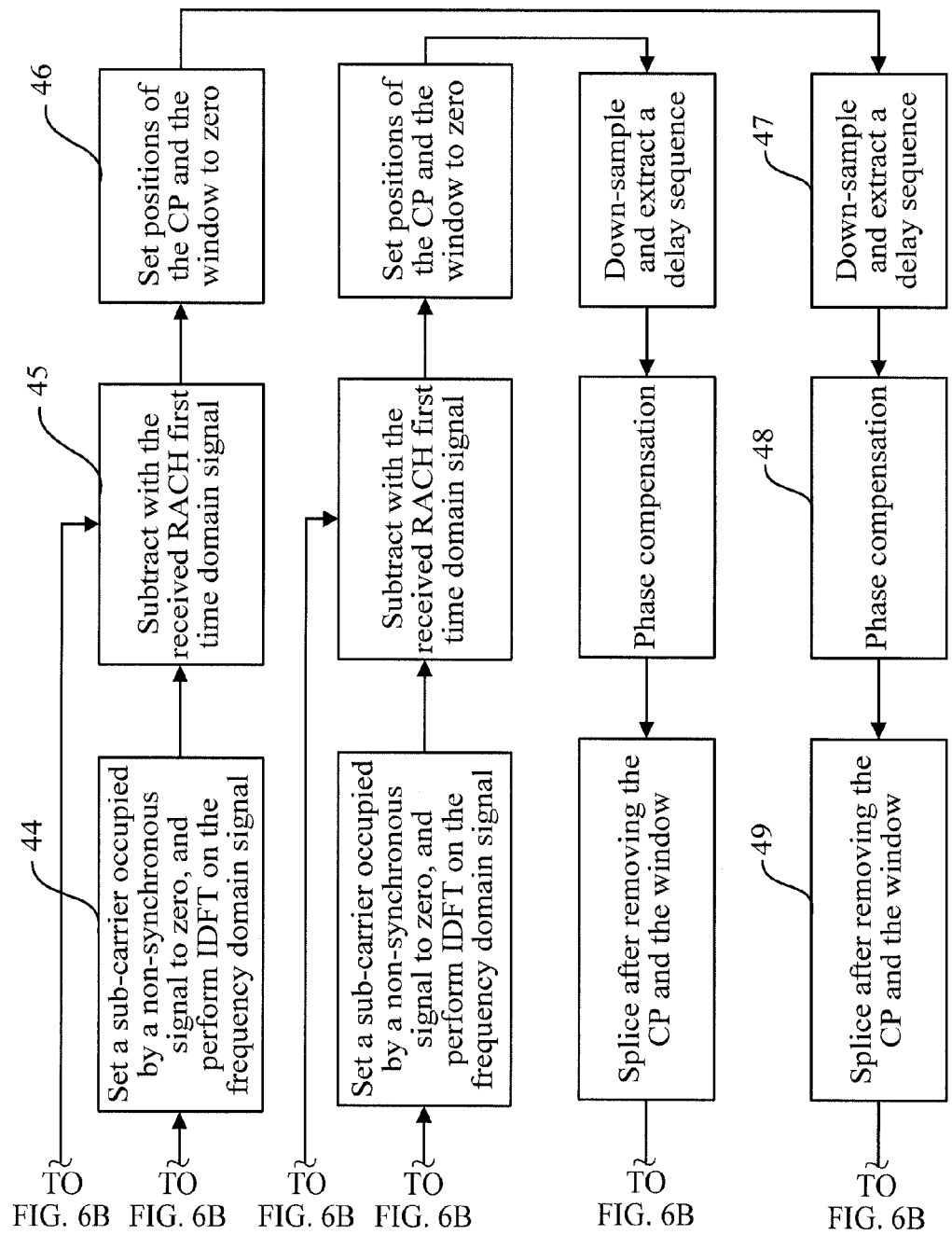
FIGS. 6A and 6B are flow charts of a fourth embodiment of a method for receiving a non-synchronous signal in an OFDMA system according to the present invention.
Figure 6B:
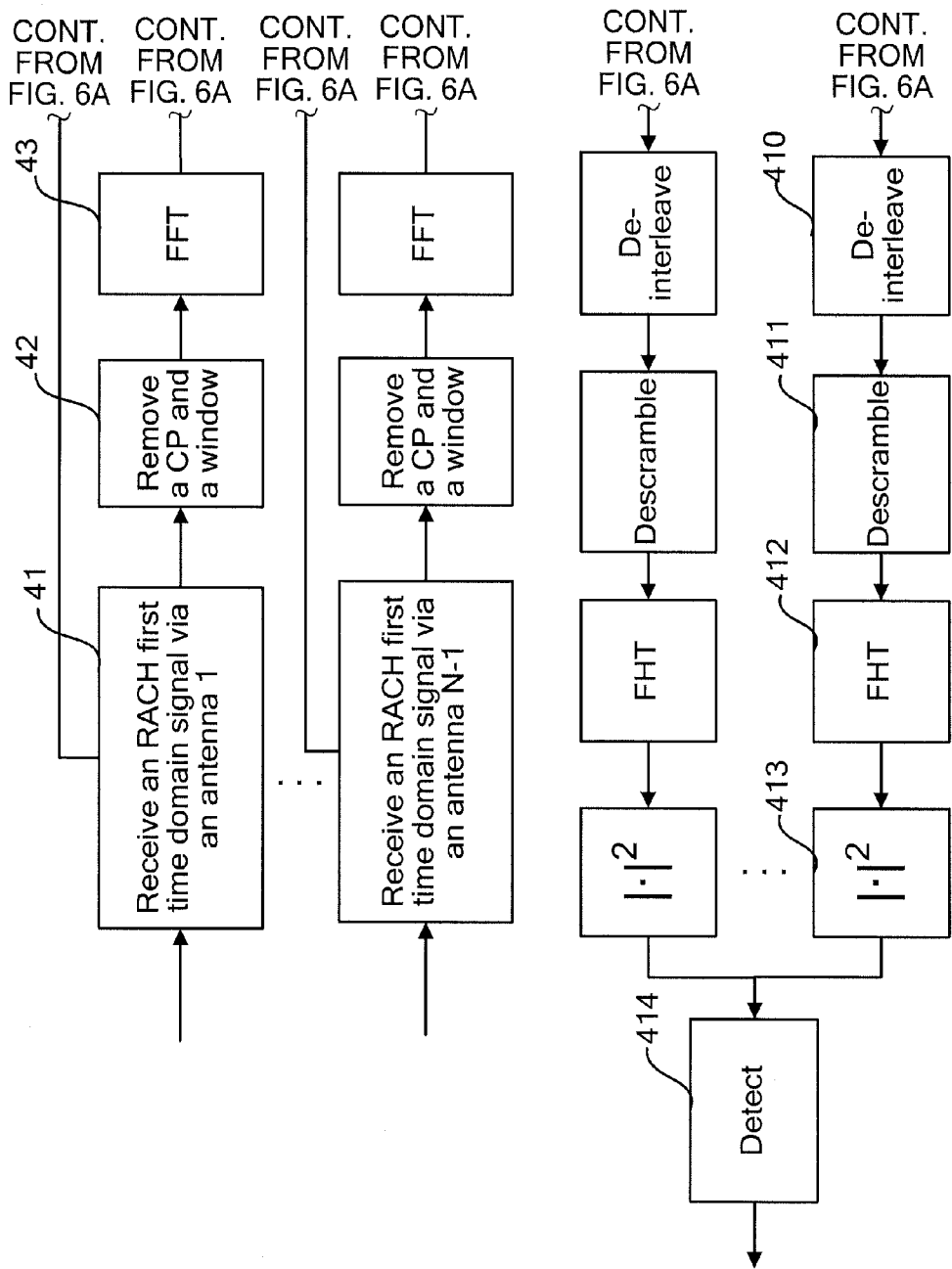

FIGS. 6A and 6B are flow charts of a fourth embodiment of a method for receiving a non-synchronous signal in an OFDMA system according to the present invention. The method of this embodiment may be another specific application at the time of detecting the RACH signal as sent in FIG. 3 in an OFDMA system based on a UMB protocol with the method for receiving a non-synchronous signal in an OFDMA system according to the present invention. As shown in FIGS. 6A and 6B, the method of this embodiment includes the following steps.

In step 41, a receiving end receives and stores an RACH first time domain signal sent by each antenna (assuming N antennas are present totally) respectively through an RACH channel.

In step 42, according to a synchronous signal of a sector in an OFDMA system, the receiving end removes the CP and the window contained in a received RACH first time domain signal with a synchronous signal time alignment method.

In step 43, the receiving end performs FFT on the RACH first time domain signal with the CP and the window removed to acquire a corresponding frequency domain signal.

In step 44, the receiving end sets a sub-carrier occupied by a band of a non-synchronous signal (that is, an RACH signal) to be received in the frequency domain signal to zero, and performs IDFT on the frequency domain signal after setting the sub-carrier occupied by the band of the non-synchronous signal to zero, to acquire another RACH time domain signal (that is, an RACH second time domain signal).

In step 45, the receiving end subtracts the RACH second time domain signal after IDFT from the received RACH first time domain signal, to acquire a time domain received signal corresponding to the band of the non-synchronous signal. The time domain received signal may be a CDMA band signal.

In step 46, the receiving end adds zeros at the CP and the window in the CDMA band signal.

In this embodiment, when the interference to the received time domain signal is eliminated, the CP and the window are not considered. Due to interference caused by other non-CDMA band signals, FFT is performed after the CP and the window in the received RACH first time domain signal are removed. In this step, zeros are added to the CP and the window in the CDMA band signal to reduce influence of the interference of the CP and the window on signal detecting performance.

In step 47, the receiving end down-samples the CDMA band signal, and extracts a delay received sequence of a CDMA band signal corresponding to each time-delay point respectively.

In step 48, phase compensation is performed on each delay received sequence.

In step 49, the CP and the window of each delay received sequence after phase compensation are removed, and the delay received sequence is spliced to acquire a complete delay received sequence without a CP. The length of the delay received sequence is the same as the length of the original delay received sequence (for example, both the delay received sequence and the original sequence occupy 1024 sub-carriers, that is, both have 1024 points).

In step 410, the delay received sequence obtained at each time-delay point is de-interleaved.

In step 411, the delay received sequence obtained at each time-delay point is descrambled.

In step 412, FHT is performed on each descrambled delay received sequence.

Since the length of each descrambled delay received sequence is the same as the length of the original delay received sequence (for example, both the delay received sequence and the original sequence occupy 1024 sub-carriers, that is, both have 1024 points), and the length is equal to $2^n$, the delay received sequence can be transformed with FHT, which simplifies the operation process and the operation complexity of the receiving end significantly.

In step 413, a modular square of a value corresponding to each transformed delay received sequence is calculated respectively, and a sum of modular squares of values corresponding to each time-delay point of different antennas is calculated.

In step 414, a maximum value of the sum of the modular squares of corresponding values after FHT received by different antennas calculated in step 413 is used as a maximum correlation peak of the RACH signal, and the RACH signal is detected and decided according to the maximum correlation peak.

In this embodiment, after the CDMA band signal is extracted, corresponding CP and the window of the CDMA band are set to zero, which is used to eliminate interference of the CP and window signals, and the implementation manner is simple. The CP and the window of the delay received sequence after phase compensation are removed, and then the delay received sequence is spliced. The length of the spliced delay received sequence is the same as the length of the original sequence, and FHT may be performed to reduce the complexity of the receiving end at the time of detecting the RACH signal.

Steps 47 to 414 for processing the CDMA band signal in the fourth embodiment of the method for receiving a non-synchronous signal in an OFDMA system according to the present invention may also process the CDMA band signal with the method in steps 25 to 213 in the second embodiment of the method for receiving a non-synchronous signal in an OFDMA system according to the present invention. The specific implementation is similar to the second embodiment of the method for receiving a non-synchronous signal in an OFDMA system according to the present invention. Likewise, the method in steps 25 to 213 for processing the CDMA band signal in the second embodiment of the method for receiving a non-synchronous signal in an OFDMA system according to the present invention may also process the CDMA band signal with the method in steps 47 to 414 in the fourth embodiment of the method for receiving a non-synchronous signal in an OFDMA system according to the present invention. The specific implementation is similar to the fourth embodiment of the method for receiving a non-synchronous signal in an OFDMA system according to the present invention, and the details will not be repeated herein.

Figure 7:
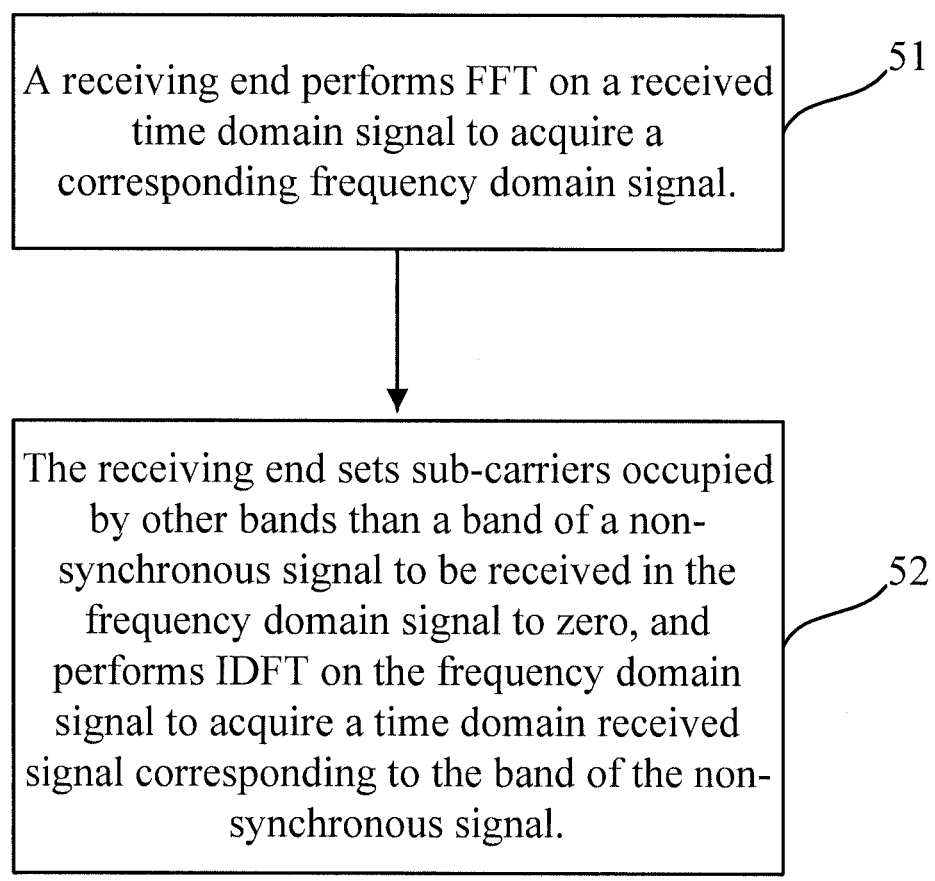
FIG. 7 is a flow chart of a fifth embodiment of a method for receiving a non-synchronous signal in an OFDMA system according to the present invention.

FIG. 7 is a flow chart of a fifth embodiment of a method for receiving a non-synchronous signal in an OFDMA system according to the present invention. As shown in FIG. 7, the method of this embodiment includes the following steps.

In step 51, a receiving end performs FFT on a time domain signal received via an antenna and an intermediate radio frequency device to acquire a corresponding frequency domain signal.

In step 52, the receiving end sets sub-carriers occupied by other bands than a band of a non-synchronous signal to be received in the frequency domain signal to zero, and performs IDFT on the frequency domain signal after setting the sub-carriers occupied by the other bands to zero, to acquire a time domain received signal corresponding to the band of the non-synchronous signal.

In this embodiment, the receiving end performs FFT on the received time domain signal to transform the signal to the corresponding frequency domain signal, by using information of the band of the non-synchronous signal to be received in the frequency domain signal, sets the sub-carriers occupied by the other bands than the band of the non-synchronous signal to be received to zero, and performs IDFT on the frequency domain signal to transform the signal to a time domain, so as to eliminate interference of the other bands to the band of the non-synchronous signal, and extract the time domain received signal of the band corresponding to the non-synchronous signal, so that the receiving end is enabled to detect with a conventional time domain receiving method. Since it is unnecessary to design and use a time domain filter, and a process of extracting the time domain received signal corresponding to the band of the non-synchronous signal is simple, the complexity of detecting the non-synchronous signal in the OFDMA system is reduced significantly, and a signal indicating that an arrival time of an OFDM multi-carrier signal exceeds one CP duration of the system time may also be detected.

This embodiment is applicable to RACH signal detection in an OFDMA system supporting a UMB protocol. In the OFDMA system supporting the UMB protocol, the RACH signal is a random access signal, that is, a non-synchronous signal. After the time domain received signal corresponding to the band of the RACH signal is acquired with the foregoing method of this embodiment, further detection of the time domain received signal corresponding to the band of the RACH signal may refer to specific description in steps 25 to 213 of the second embodiment of the method for receiving a non-synchronous signal in an OFDMA system according to the present invention, together with the demonstration of FIGS. 2a to 4, the details of which will not be repeated herein.

Figure 8:
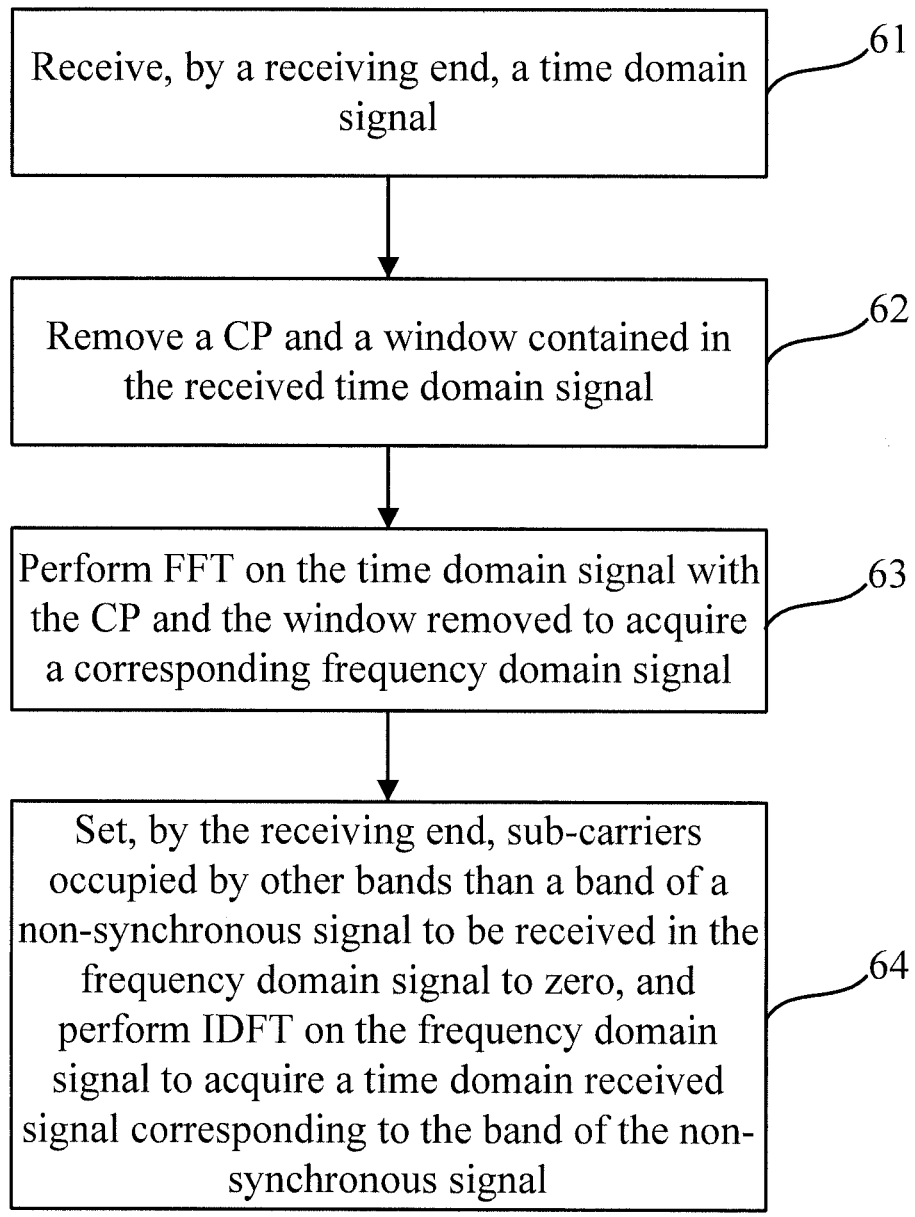
FIG. 8 is a flow chart of a sixth embodiment of a method for receiving a non-synchronous signal in an OFDMA system according to the present invention.

FIG. 8 is a flow chart of a sixth embodiment of a method for receiving a non-synchronous signal in an OFDMA system according to the present invention. As shown in FIG. 8, the method of this embodiment includes the following steps.

In step 61, a receiving end receives a time domain signal.

In step 62, according to a synchronous signal of a sector in an OFDMA system, the receiving end removes the CP and the window contained in the received time domain signal with a synchronous signal time alignment method.

In step 63, the receiving end performs FFT on the first time domain signal with the CP and the window removed to acquire a corresponding frequency domain signal.

In step 64, the receiving end sets sub-carriers occupied by other bands than a band of a non-synchronous signal to be received in the frequency domain signal to zero, and performs IDFT on the frequency domain signal after setting the sub-carriers occupied by the other bands to zero, to acquire a time domain received signal corresponding to the band of the non-synchronous signal.

This embodiment does not need to design or use a time domain filter with a fixed bandwidth. Instead, a synchronous signal frequency domain receiving method in the prior art is adopted to intercept the received time domain signal. After FFT is performed on the received time domain signal to transform the signal to a frequency domain, the sub-carriers occupied by the other bands than the band of the non-synchronous signal to be received are set to zero, and IDFT is performed on the frequency domain signal to transform the signal to a time domain, so as to eliminate interference of the other bands to the band of the non-synchronous signal, and extract the time domain received signal of the band corresponding to the non-synchronous signal, so that the receiving end is enabled to detect with a conventional time domain receiving method. This embodiment is easy to implement and can obtain a complete OFDM band symbol. Besides, only the interference of the time domain received signal corresponding to the OFDM band signal (instead of the complete time domain received signal) is eliminated, so that the complexity of the operation that the receiving end detects the non-synchronous signal in the OFDMA system is further reduced. Moreover, as a time domain receiving method is employed to process the non-synchronous signal in this embodiment, a signal indicating that an arrival time of an OFDM multi-carrier signal exceeds one CP duration of the system time can be detected, and the complexity of the receiving end is also reduced.

This embodiment is applicable to RACH signal detection in an OFDMA system supporting a UMB protocol. In the OFDMA system supporting the UMB protocol, the RACH signal is a random access signal, that is, a non-synchronous signal. After the time domain received signal corresponding to the band of the RACH signal is acquired with the foregoing method of this embodiment, further detection of the time domain received signal corresponding to the band of the RACH signal may refer to specific description in steps 46 to 414 of the fourth embodiment of the method for receiving a non-synchronous signal in an OFDMA system according to the present invention, together with the demonstration of FIG. 6, the details of which will not be repeated herein.

Figure 9:
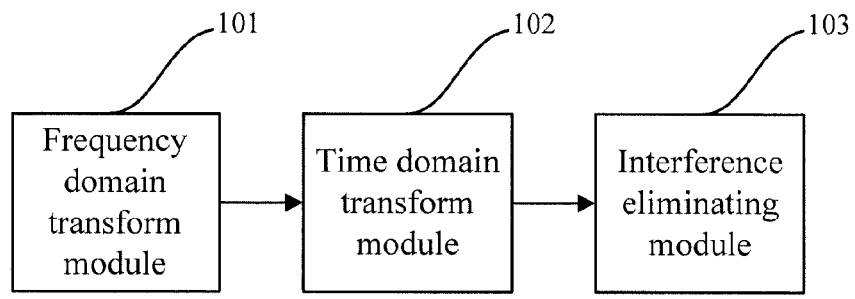
FIG. 9 is a structural view of a first embodiment of a device for receiving a non-synchronous signal in an OFDMA system according to the present invention.

FIG. 9 is a structural view of a first embodiment of a device for receiving a non-synchronous signal in an OFDMA system according to the present invention. As shown in FIG. 9, the device of this embodiment includes a frequency domain transform device 101, a time domain transform device 102, and an interference eliminating device 103.

The frequency domain transform device 101 is configured to perform FFT on a first time domain signal received via an antenna and an intermediate radio frequency device to acquire a corresponding frequency domain signal.

The time domain transform device 102 is configured to set a sub-carrier occupied by a band of a non-synchronous signal to be received in the frequency domain signal to zero, and perform IDFT on the frequency domain signal after setting the sub-carrier occupied by the band of the non-synchronous signal to zero, to acquire a second time domain signal.

The interference eliminating device 103 is configured to subtract the second time domain signal obtained by IDFT from the received first time domain signal, to acquire a time domain received signal corresponding to the band of the non-synchronous signal.

In this embodiment, the frequency domain transform device performs FFT on the received first time domain signal to transform the signal to the corresponding frequency domain signal. By using information of the band of the non-synchronous signal to be received in the frequency domain signal, the time domain transform device sets the sub-carrier occupied by the non-synchronous signal to be received to zero, and performs IDFT on the frequency domain signal to transform the signal to a time domain to acquire the second time domain signal. The interference eliminating device subtracts the second time domain signal output by the time domain transform device from the received first time domain signal, so as to obtain the time domain received signal corresponding to the band of the non-synchronous signal, so that interference of the other bands to the band of the non-synchronous signal is eliminated. Since it is unnecessary to design and use an existing time domain filter, and a process of extracting the time domain received signal corresponding to the band of the non-synchronous signal is simple, the complexity of detecting the non-synchronous signal in the OFDMA system is reduced significantly. Meanwhile, since the non-synchronous signal is processed with a time domain receiving method, a signal indicating that an arrival time of an OFDM multi-carrier signal exceeds one CP duration of the system time can be detected.

Figure 10:
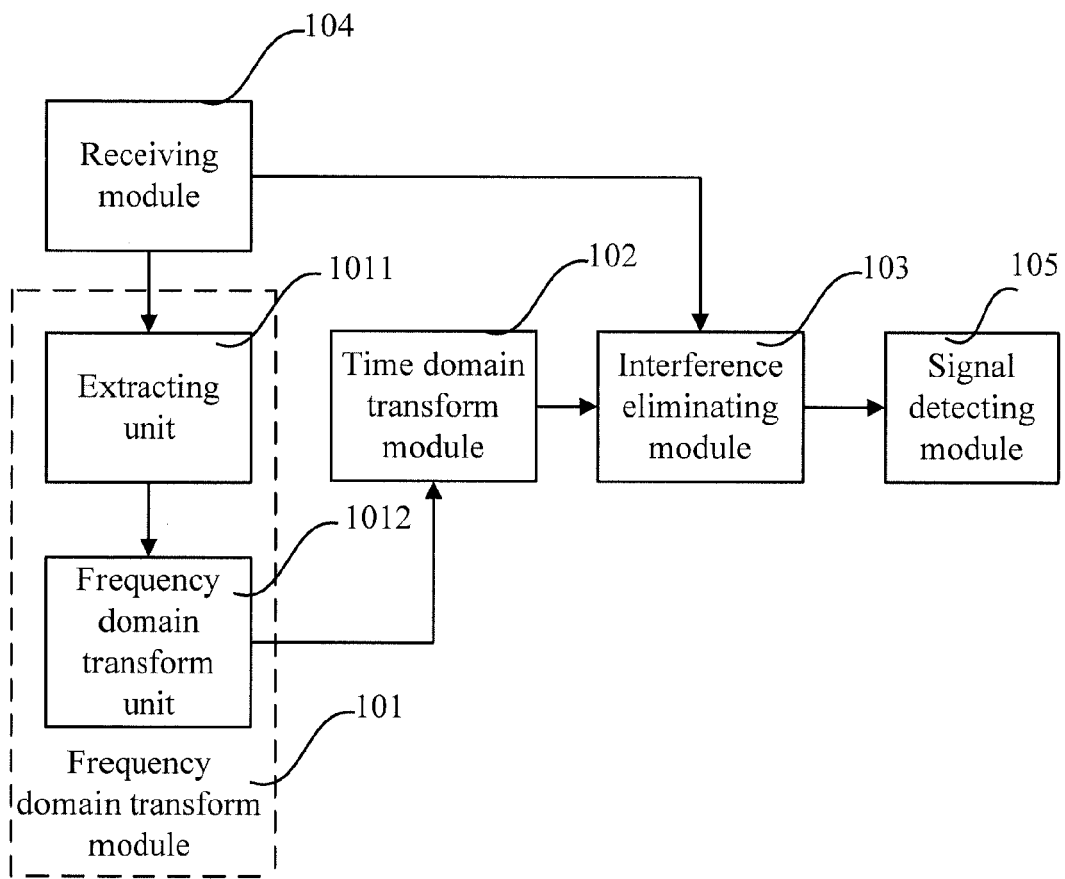
FIG. 10 is a structural view of a second embodiment of a device for receiving a non-synchronous signal in an OFDMA system according to the present invention.

FIG. 10 is a structural view of a second embodiment of a device for receiving a non-synchronous signal in an OFDMA system according to the present invention. As shown in FIG. 10, the difference between this embodiment and the first embodiment of the device for receiving a non-synchronous signal in an OFDMA system according to the present invention is that, the device of this embodiment further includes a receiving device 104 and a signal detecting device 105; and the frequency domain transform device 101 further includes an extracting device 1011 and a frequency domain transform device 1012.

The receiving device 104 is configured to receive and store a first time domain signal sent by a user terminal through an RACH channel, and forward the received first time domain signal to the frequency domain transform device 101 and the interference eliminating device 103.

The extracting device 1011 is configured to remove the CP and the window contained in the first time domain signal received by the receiving device 104.

The frequency domain transform device 1012 is configured to perform FFT on the first time domain signal acquired by the extracting device 1011 with the CP and the window removed to obtain a corresponding frequency domain signal, and send the frequency domain signal to the time domain transform device 102.

The signal detecting device 105 is configured to process a time domain received signal corresponding to a band of the non-synchronous signal output by the interference eliminating device 103. Specifically, the signal detecting device 105 is configured to extract a delay received sequence corresponding to each time-delay point of the time domain received signal respectively; splice each delay received sequence; and perform FHT on each spliced delay received sequence, calculate a modular square of a value corresponding to each transformed delay received sequence respectively, and detect the received time domain signal according to each calculated modular square.

In this embodiment, the first time domain signal received by the receiving device 104 is sent to the frequency domain transform device 101 and the interference eliminating device 103 respectively. The extracting device 1011 of the frequency domain transform device 101 removes the CP and the window contained in the first time domain signal, the frequency domain transform device 1012 performs FFT to acquire the corresponding frequency domain signal, and the time domain transform device 102 sets each sub-carrier other than the sub-carrier occupied by the non-synchronous signal in a complete frequency domain to zero. The interference eliminating device 103 subtracts the second time domain signal from the first time domain signal to acquire a time domain received signal corresponding to the band of the non-synchronous signal. Detection and decision of the non-synchronous signal may be performed on the time domain received signal by the signal detecting device 105. This embodiment is easy to implement and can obtain a complete OFDM band symbol. Besides, only the interference of the time domain received signal corresponding to the OFDM band signal (instead of the complete time domain received signal) is eliminated, so that the complexity of the operation that the receiving end detects the non-synchronous signal in the OFDMA system is further reduced. Moreover, as a time domain receiving method is employed to process the non-synchronous signal in this embodiment, a signal indicating that an arrival time of an OFDM multi-carrier signal exceeds one CP duration of the system time can be detected, and the complexity of the receiving end is also reduced.

Figure 11:
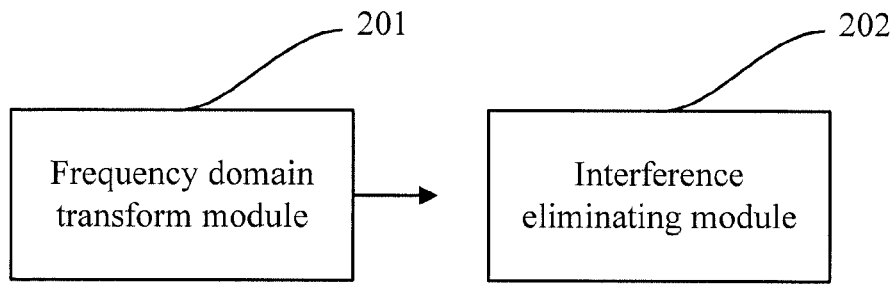
FIG. 11 is a structural view of a third embodiment of a device for receiving a non-synchronous signal in an OFDMA system according to the present invention.

FIG. 11 is a structural view of a third embodiment of a device for receiving a non-synchronous signal in an OFDMA system according to the present invention. As shown in FIG. 11, the device of this embodiment includes a frequency domain transform device 201 and an interference eliminating device 202.

The frequency domain transform device 201 is configured to perform FFT on a time domain signal received via an antenna and an intermediate radio frequency device to acquire a corresponding frequency domain signal.

The interference eliminating device 202 is configured to set sub-carriers occupied by other bands than a band of a non-synchronous signal to be received in the frequency domain signal to zero, and perform IDFT on the frequency domain signal after setting the sub-carriers occupied by the other bands to zero, to acquire a time domain received signal corresponding to the band of the non-synchronous signal.

In this embodiment, the frequency domain transform device performs FFT on the received time domain signal to transform the signal to the corresponding frequency domain signal, and by using information of the band of the non-synchronous signal to be received in the frequency domain signal, the interference eliminating device sets the sub-carriers occupied by the other bands than the band of the non-synchronous signal to be received to zero, and performs IDFT on the frequency domain signal to transform the signal to a time domain, so as to eliminate interference of the other bands to the band of the non-synchronous signal, and acquire the time domain received signal corresponding to the band of the non-synchronous signal. Since it is unnecessary to design and use a time domain filter, and a process of extracting the time domain received signal corresponding to the band of the non-synchronous signal is simple, the complexity of detecting the non-synchronous signal in the OFDMA system is largely reduced. Meanwhile, since the non-synchronous signal is processed with a time domain receiving method, a signal indicating that an arrival time of an OFDM multi-carrier signal exceeds one CP duration of the system time can be detected.

Figure 12:
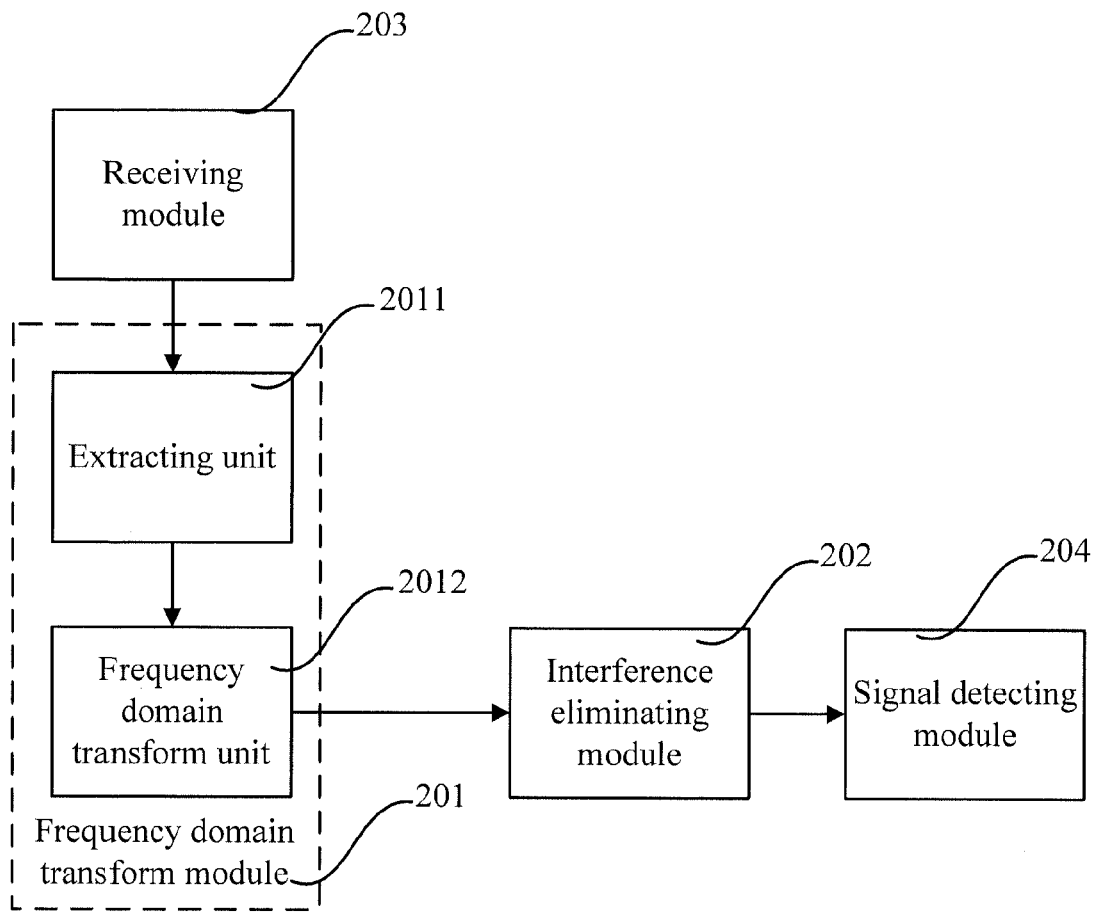
FIG. 12 is a structural view of a fourth embodiment of a device for receiving a non-synchronous signal in an OFDMA system according to the present invention.

FIG. 12 is a structural view of a fourth embodiment of a device for receiving a non-synchronous signal in an OFDMA system according to the present invention. As shown in FIG. 12, the difference between this embodiment and the third embodiment of the device for receiving a non-synchronous signal in an OFDMA system according to the present invention is that, the device of this embodiment further includes a receiving device 203 and a signal detecting device 204; and the frequency domain transform device 201 further includes an extracting device 2011 and a frequency domain transform device 2012.

The receiving device 203 is configured to receive a time domain signal sent by a user terminal through an RACH channel, and forward the received time domain signal to the frequency domain transform device 201.

The extracting device 2011 is configured to remove the CP and the window contained in the time domain signal received by the receiving device 203.

The frequency domain transform device 2012 is configured to perform FFT on the time domain signal acquired by the extracting device 2011 with the CP and the window removed to obtain a corresponding frequency domain signal, and forward the frequency domain signal to the interference eliminating device 202.

The signal detecting device 204 is configured to process a time domain received signal corresponding to a band of the non-synchronous signal output by the interference eliminating device 202. Specifically, the signal detecting device 204 is configured to extract a delay received sequence corresponding to each time-delay point of the time domain received signal respectively; splice each delay received sequence; and perform FHT on each spliced delay received sequence, calculate a modular square of a value corresponding to each transformed delay received sequence respectively, and detect the received time domain signal according to each calculated modular square.

According to this embodiment, the CP and the window contained in the time domain signal received by the receiving device 203 are removed via the extracting device 2011, the frequency domain transform device 2012 performs FFT to acquire the corresponding frequency domain signal, and by using information of the band of the non-synchronous signal to be received in the frequency domain signal, the interference eliminating device 202 sets the sub-carriers occupied by the other bands than the band of the non-synchronous signal to be received to zero, and performs IDFT on the frequency domain signal to transform the signal to a time domain, so as to eliminate interference of the other bands to the band of the non-synchronous signal, and obtain the time domain received signal corresponding to the band of the non-synchronous signal. Detection and decision of the non-synchronous signal can be performing on the time domain received signal by the signal detecting device 105. This embodiment is easy to implement and can obtain a complete OFDM band symbol. Besides, only the interference of the time domain received signal corresponding to the OFDM band signal (instead of the complete time domain received signal) is eliminated, so that the complexity of the operation that the receiving end detects the non-synchronous signal in the OFDMA system is further reduced. Moreover, as a time domain receiving method is employed to process the non-synchronous signal in this embodiment, a signal indicating that an arrival time of an OFDM multi-carrier signal exceeds one CP duration of the system time can be detected, and the complexity of a receiving end is also reduced.

The embodiment of the device for receiving a non-synchronous signal in an OFDMA system according to the present invention may apply the embodiment of the method for receiving a non-synchronous signal in an OFDMA system according to the present invention. The specific principle may refer to the description in the embodiments of the method for receiving a non-synchronous signal in an OFDMA system according to the present invention, and the details will not be repeated herein.

Persons of ordinary skill in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (ROM), a Random Access Memory (RAM), a magnetic disk, or a compact disk.

The word "receive" in the embodiments of the present invention may be understood as actively acquiring information from other devices or receiving information sent by other devices.

It is understandable to those skilled in the art that the accompanying drawings are for illustrating the preferred embodiments only, and the devices or processes in the accompanying drawings are not mandatory.

In addition, the devices in the device in the embodiments of the present invention may be distributed in the way described herein, or distributed in other ways, for example, in one or more other devices. The devices may be combined into one device, or split into multiple sub-devices.

The serial number of the embodiments given above is for clear description only, and does not represent the order of preference.

It should be noted that the above embodiments are merely provided for elaborating the technical solutions of the present invention, but not intended to limit the present invention. Although the present invention has been described in detail with reference to the foregoing embodiments, it is apparent that those skilled in the art can make various modifications and variations to the invention without departing from the spirit and scope of the invention. The invention shall cover the modifications and variations provided that they fall in the scope of protection defined by the following claims or their equivalents.

What is claimed is:

1. A method of receiving a non-synchronous signal in an Orthogonal Frequency Division Multiple Access (OFDMA) system, comprising:
   performing Fourier transform on a received first time domain signal to acquire a frequency domain signal corresponding to the received first time domain signal; and
   setting a sub-carrier occupied by a band of a non-synchronous signal to be received in the frequency domain signal to zero, performing inverse Fourier transform on the frequency domain signal to acquire a second time domain signal, and subtracting the second time domain signal from the first time domain signal to acquire a time domain received signal corresponding to the band of the non-synchronous signal; and
   wherein the method is enabled to acquire the time domain received signal corresponding to the band of the non-synchronous signal by setting a sub-carrier other than the sub-carrier occupied by the band of the non-synchronous signal to zero, and performing inverse Fourier transform on the frequency domain signal.

2. The method for receiving a non-synchronous signal in an OFDMA system according to claim 1, wherein before the performing Fourier transform on the received first time domain signal, the method further comprises:
   receiving and storing the first time domain signal.

3. The method for receiving a non-synchronous signal in an OFDMA system according to claim 1, wherein after the acquiring the time domain received signal corresponding to the band of the non-synchronous signal, the method further comprises:
   extracting a delay received sequence corresponding to each time-delay point of the time domain received signal respectively; and
   splicing each delay received sequence.

4. The method for receiving a non-synchronous signal in an OFDMA system according to claim 3, wherein after the splicing each delay received sequence, the method further comprises:
   in the spliced delay received sequence, combining a signal of the Cyclic Prefix (CP) and a signal of a corresponding CP in the sequence.

5. The method for receiving a non-synchronous signal in an OFDMA system according to claim 3, wherein the splicing each delay received sequence comprises:
   removing the CP and a window contained in each delay received sequence respectively; and
   splicing each delay received sequence with the CP and the window removed.

6. The method for receiving a non-synchronous signal in an OFDMA system according to claim 3, wherein before the extracting the delay received sequence corresponding to each time-delay point of the time domain received signal respectively, the method further comprises:
   down-sampling the time domain received signal.

7. The method for receiving a non-synchronous signal in an OFDMA system according to claim 3, wherein before the splicing each delay received sequence, the method further comprises:

performing phase compensation on each delay received sequence respectively.

8. The method for receiving a non-synchronous signal in an OFDMA system according to claim 1, wherein the performing Fourier transform on a received first time domain signal to acquire a frequency domain signal corresponding to the received first time domain signal comprises:

removing the Cyclic Prefix (CP) and the window contained in the first time domain signal; and performing Fourier transform on the first time domain signal with the CP and the window removed to obtain the frequency domain signal corresponding to the first time domain signal.

9. The method for receiving a non-synchronous signal in an OFDMA system according to claim 8, wherein after the acquiring the time domain received signal corresponding to the band of the non-synchronous signal, the method further comprises:

setting the CP and the window in the time domain received signal to zero.

10. The method for receiving a non-synchronous signal in an OFDMA system according to claim 9, wherein after the setting the corresponding CP and window in the time domain received signal to zero, the method further comprises:

extracting a delay received sequence corresponding to each time-delay point of the time domain received signal respectively; and splicing each delay received sequence.

11. The method for receiving a non-synchronous signal in an OFDMA system according to claim 10, wherein after the splicing each delay received sequence, the method further comprises:

in the spliced delay received sequence, combining a signal of the CP and a signal of a corresponding CP in the sequence.

12. The method for receiving a non-synchronous signal in an OFDMA system according to claim 10, wherein the splicing each delay received sequence comprises:

removing the CP and the window contained in each delay received sequence respectively; and splicing each delay received sequence with the CP and the window removed.

13. The method for receiving a non-synchronous signal in an OFDMA system according to claim 10, wherein before the extracting the delay received sequence corresponding to each time-delay point of the time domain received signal respectively, the method further comprises:

down-sampling the time domain received signal.

14. The method for receiving a non-synchronous signal in an OFDMA system according to claim 10, wherein before the splicing each delay received sequence, the method further comprises:

performing phase compensation on each delay received sequence respectively.

15. The method for receiving a non-synchronous signal in an OFDMA system according to claim 10, wherein after the splicing each delay received sequence, the method further comprises any one or any combination of the following steps:

de-interleaving each spliced delay received sequence;
descrambling each spliced delay received sequence; and
performing Fast Hadamard Transform (FHT) on each spliced delay received sequence, calculating a modular square of a value corresponding to each transformed delay received sequence respectively, and detecting the first time domain signal according to each calculated modular square.

16. A device of receiving a non-synchronous signal in an Orthogonal Frequency Division Multiple Access (OFDMA) system, comprising:

a frequency domain transform device, configured to perform Fourier transform on a received first time domain signal to acquire a corresponding frequency domain signal; and an interference eliminating device, configured to set a sub-carrier occupied by a band of a non-synchronous signal to be received in the frequency domain signal to zero, perform inverse Fourier transform on the frequency domain signal to acquire a second time domain signal, and subtract the second time domain signal from the first time domain signal to acquire a time domain received signal corresponding to the band of the non-synchronous signal; and wherein the device is enabled to acquire the time domain received signal corresponding to the band of the non-synchronous signal by setting a sub-carrier other than the sub-carrier occupied by the band of the non-synchronous signal to be received in the frequency domain signal to zero, and performing inverse Fourier transform on the frequency domain signal.

17. The device for receiving a non-synchronous signal in an OFDMA system according to claim 16, further comprising:

a receiving device, configured to receive and store the first time domain signal.

18. The device for receiving a non-synchronous signal in an OFDMA system according to claim 16, wherein the frequency domain transform device comprises:

an extracting device, configured to remove a Cyclic Prefix (CP) and a window contained in the first time domain signal; and a frequency domain transform device, configured to perform Fourier transform on the first time domain signal with the CP and the window removed to obtain the corresponding frequency domain signal.

19. The device for receiving a non-synchronous signal in an OFDMA system according to claim 17, wherein the frequency domain transform device comprises:

an extracting device, configured to remove the Cyclic Prefix (CP) and the window contained in the first time domain signal; and a frequency domain transform device, configured to perform Fourier transform on the first time domain signal with the CP and the window removed to obtain the corresponding frequency domain signal.

20. The device for receiving a non-synchronous signal in an OFDMA system according to claim 18, further comprising:

a signal detecting device, configured to extract a delay received sequence corresponding to each time-delay point of the time domain received signal respectively; splice each delay received sequence; and perform Fast Hadamard Transform (FHT) on each spliced delay received sequence, calculate a modular square of a value corresponding to each transformed delay received sequence respectively, and detect the received time domain signal according to each calculated modular square.

* * * * *